Figure 1:
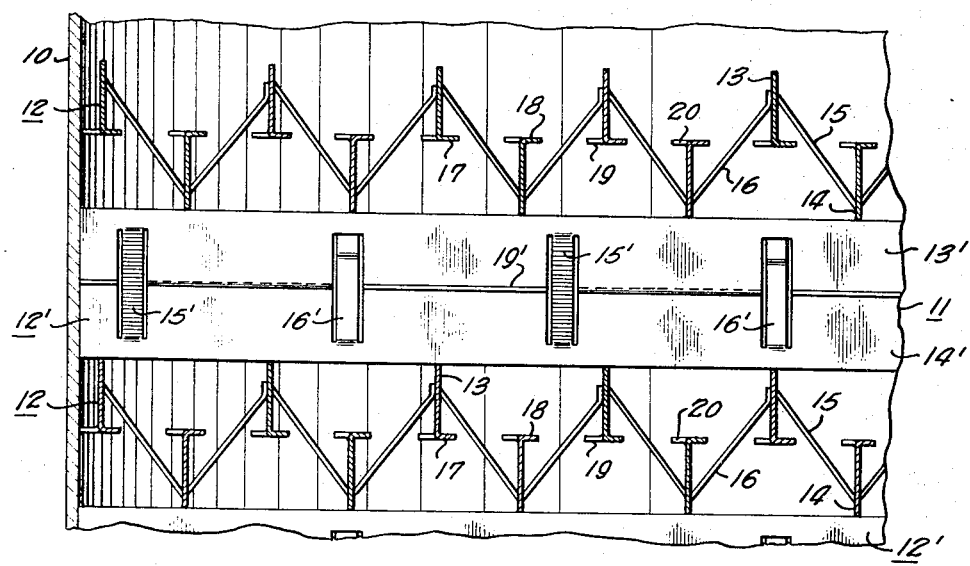

INVENTORS
Francis W. Winn
Hans C. Glitsch

ATTORNEYS

INVENTORS
Francis W. Winn
Hans C. Glitsch
BY
ATTORNEYS

Sept. 26, 1967     F. W. WINN ETAL     3,343,821
GRIDS FOR VAPOR-LIQUID CONTACT APPARATUS
Filed Feb. 5, 1964     4 Sheets-Sheet 3
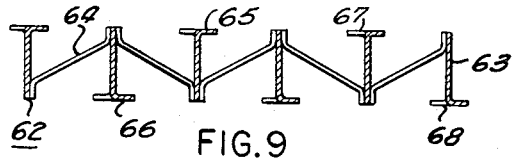
FIG. 9
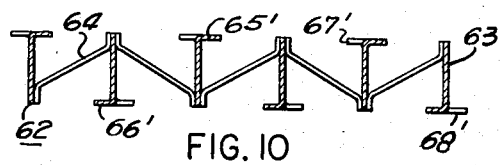
FIG. 10
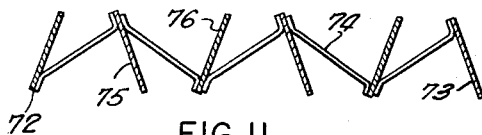
FIG. 11
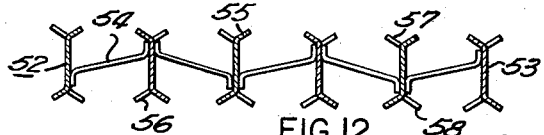
FIG. 12
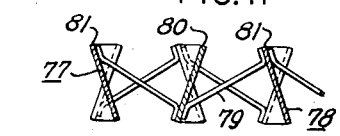
FIG. 13
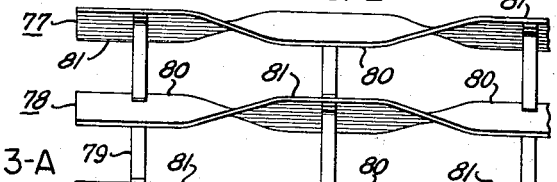
FIG. 13-A
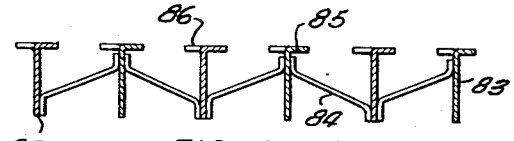
FIG. 14
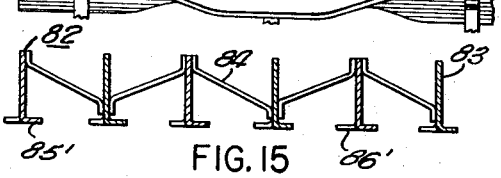
FIG. 15
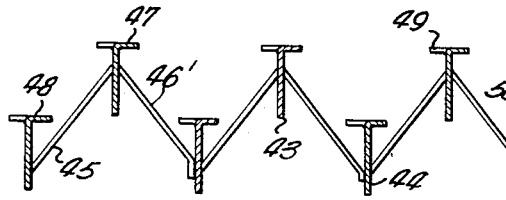
FIG. 16
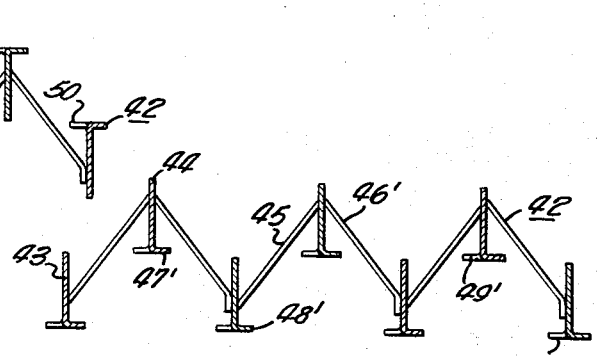
FIG. 17
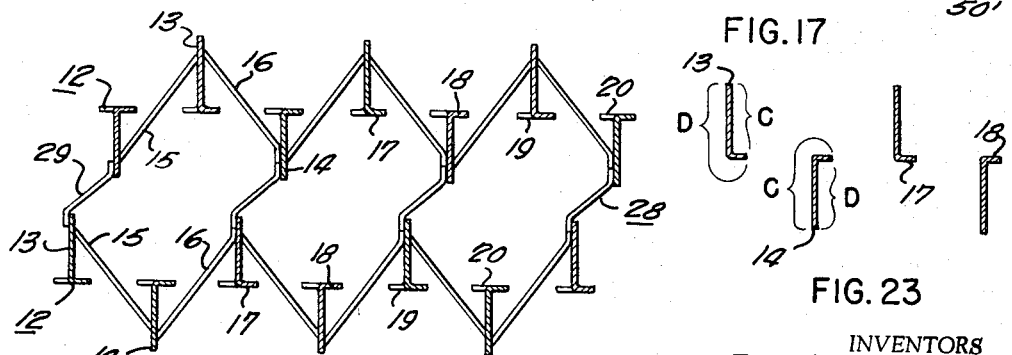
FIG. 18     FIG. 23
INVENTORS
Francis W. Winn
Hans C. Glitsch
BY *Ahley & Ahley*
ATTORNEYS INVENTORS
Francis W. Winn
Hans C. Glitsch
BY
*Shley & Shley*
ATTORNEYS United States Patent Office 3,343,821
Patented Sept. 26, 1967

3,343,821
GRIDS FOR VAPOR-LIQUID CONTACT APPARATUS
Francis W. Winn and Hans C. Glitsch, Dallas, Tex., assignors to Fritz W. Glitsch & Sons, Inc., Dallas, Tex., a corporation of Delaware
Filed Feb. 5, 1964, Ser. No. 342,694
10 Claims. (Cl. 261—112)

This invention relates to new and useful improvements in grids for vapor-liquid contact apparatus.

As set forth in the Winn Patent No. 3,079,134, it is most desirable to employ apparatus that efficiently improves the quality as well as the quantity of a product without increasing reflux rates or by the uneconomical use of introduced utilities, such as steam, in the vapor-liquid contact art. Also, it is important to obtain close fractionation and separation of the feed stock constituents for purity and eliminate harmful or undesirable residual elements such as solids, conradson carbon and metals which are present in many chemical and petroleum feed stocks. Furthermore, it is desirable that the apparatus operate effiiciently for heat transfer, fluid vaporization, or vapor condensing duty whereby cooling of one of the fluids can be accomplished with a minimum pressure drop through and in a zone of minimum dimensions defining its area and volume.

It is one object of the invention to provide an improved grid for vapor-liquid contact apparatus which ensures intimate contact between vapors and liquids so as to obtain high efficiency, low pressure drop, and reduced temperatures.

Another object of the invention is to provide an improved grid, of the character described, that does not unduly restrict the flow of the ascending vapor or its countercurrent contact with the descending liquid while having sufficient superficial area for vapor-liquid contact and also sufficient superficial area to function primarily in the reduction or elimination of liquid entrainment carried by or present in the ascending vapor.

Another object of the invention is provided an improved grid, of the character described, having sufficient mass and superficial area in both its horizontal and vertical planes so that fractions of the heavy constituents are conducted downwardly in condensed form and the vapor is permitted to rise through the grid with minimum impedance.

Another object of the invention is to provide an improved vapor-liquid contact grid for use in vacuum and other services, such as the separation of light and heavy gas oils from crude oil or crude oil residuum under vacuum for subsequent use as a feed stock in a catalytic cracking process, so that the pressure drop is minimized and the product is of improved quality.

Another object of the invention is to provide an improved self cleaning grid, of the character described, wherein undesirable solids or heavy constituents of the feed stock as well as the con-carbon and metal content thereof are removed by the coaction of the descending liquid and ascending vapor.

Another object of the invention is to provide an improved grid, of the character described, which is adapted to be assembled from a plurality of superimposed layers and wherein the structural configuration of the grid members of each layer utilizes the velocity and kinetic energy of the ascending vapors to perform the dual function of eliminating liquid entrainment in the ascending vapor and the thorough and turbulent contacting of the vapor with the descending liquid to accomplish efficient separation of fractionation of the fluids into desired components.

Another object of the invention is to provide an improvement grid, of the character described, wherein the structural configuration of the grid members of each layer and the metal mass and superficial area of the grid function as an efficient heat transfer or vapor condensing apparatus whereby quick cooling of the ascending vapor is accomplished with minimum pressure drop and in a minimum vertical depth of the grid.

Another object of the invention is to provide an improved grid, of the character described, having adequate vapor passages in the horizontal planes of the grid layers to ensure the flow of vapor and distribution thereof within said layers and prevent maldistribution or channeling of the vapor through certain portions of said layers.

A particular object of the invention is to provide an improved grid, of the character described, having a plurality of layers with the grid members of each layer having angularly disposed adjacent elements, each element having a structural configuration and angularity that permits a large upright vapor passage area which is in excess of one-half the horizontal area of the layer and which creates a projected horizontal superficial area, the summation of such projected areas of the angularly disposed elements of said members in the same horizontal plane being essentially equivalent to the difference of the horizontal area occupied by said layer and the large upright vapor passage area created by the structural configuration and angularly disposed elements in said layer.

Another object of the invention is to provide an improved grid, of the character described, wherein the structural configuration of the grid members of each layer or the assembly of the superimposed layers of the grid ensures thorough and turbulent mixing or contacting of ascending vapor and descending liquid without materially displacing either the vapor or liquid from its geographic or vertical location in the grid and prevents maldistribution or channeling of either the vapor or liquid through certain portions of said grid or its layers.

Another object of the invention is to provide an improved grid, of the character described, wherein the structural configuration and adjacent relationship of the grid members of each layer form lineal vapor orifice passages whereby vapor turbulence is created by said orifices to ensure intimate vapor-liquid contact and such turbulence is lineally controlled to ensure the ascending vapor performing its dual function of liquid contact and liquid disentrainment within close proximity to the vertical location at which the ascending vapor approaches or leaves said vapor passage orifices whereby maldistribution of the ascending vapor or descending liquid is prevented.

Another object of the invention is to provide an improved grid, of the character described, wherein each layer has a large upright vapor passage area which is in excess of one-half of the horizontal area of the layer.

Another object of the invention is to provide an improved grid, of the character described, wherein the layers are constructed so as to have structural rigidity for withstanding upward and downward loads or forces and so as to space the horizontal portions of said layers a distance apart sufficient to ensure commingling of the ascending vapors substantially through the entire volume or space occupied by each layer in a horizontal palne.

Another object of the invention is to provide an improved vapor-liquid contact grid which is of economical manufacture, which is designed structurally so as to be self-supporting over relatively long spans, and which may be constructed of metallic, nonmetallic or plastic material or sheet metal of any desired analysis, such as but not limited to carbon steel, stainless steel, nickel, titanium or copper base alloys.

Another object of the invention is to provide an improved grid having a plurality of grid layers or layer banks, of the character described, which is adapted to be formed in elongate, relatively narrow sections to permit the passage thereof through the manholes of pressure vessels and the assembly of the sections into superimposed layers or layer banks with each layer or layer bank resting on the layer or layer bank therebelow and oriented at any desired angle thereto, such as 30°, 45°, 60°, or 90°.

A construction designed to carry out the invention will be hereinafter described, together with other features of the invention.

Figure 2:
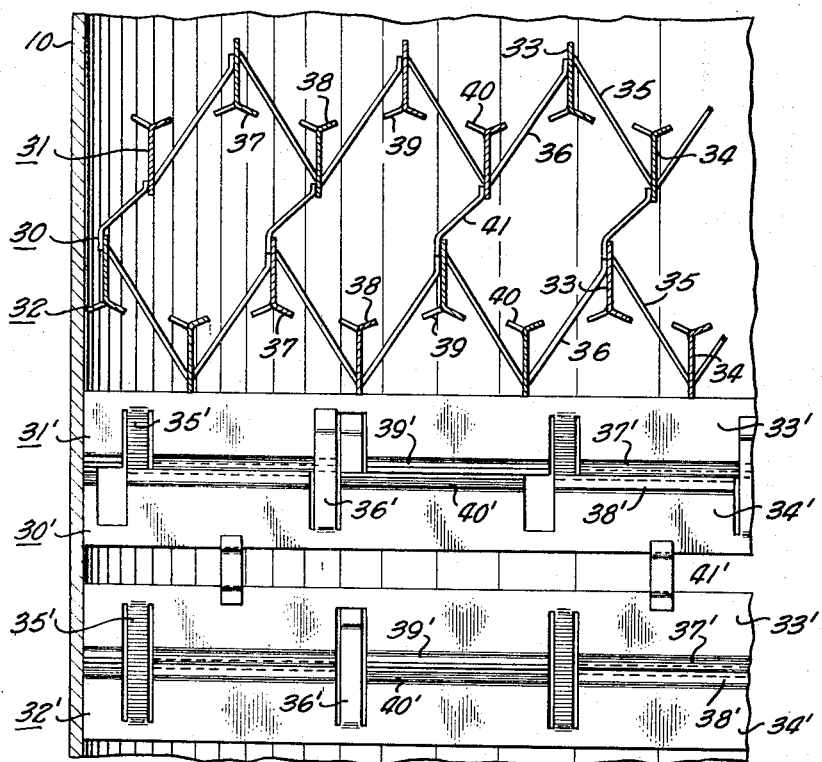
Figure 3:
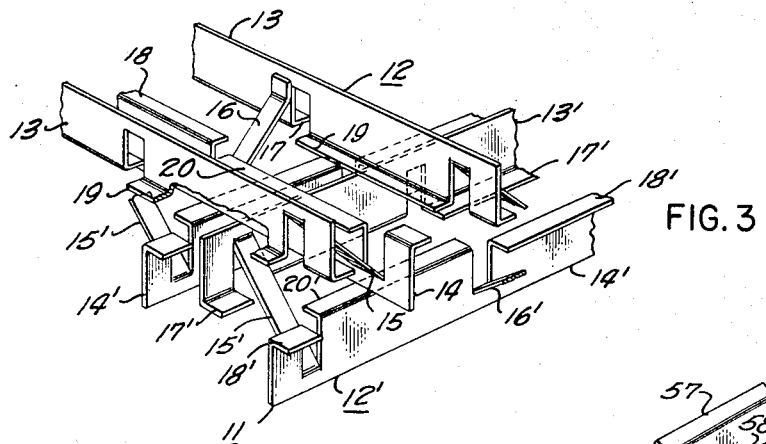
Figures 4, 5:
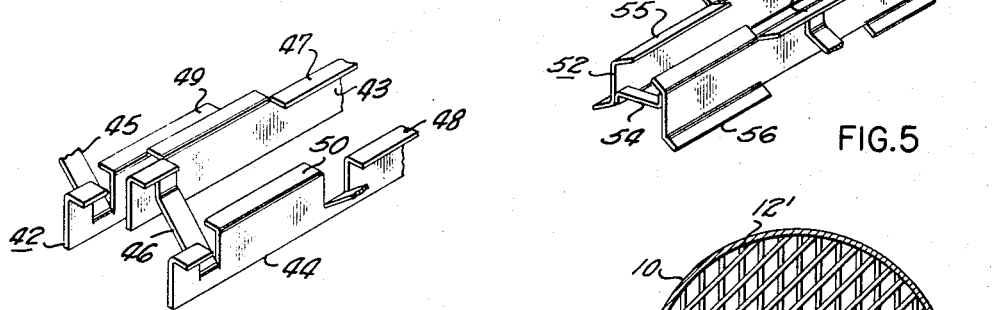
Figure 6:
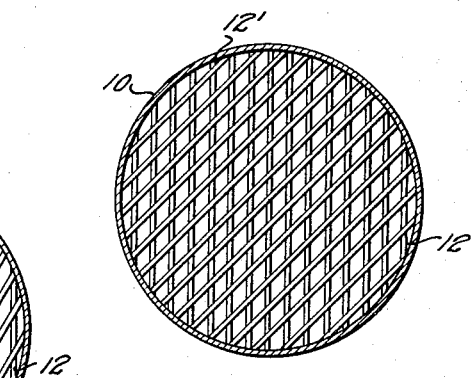
Figure 7:
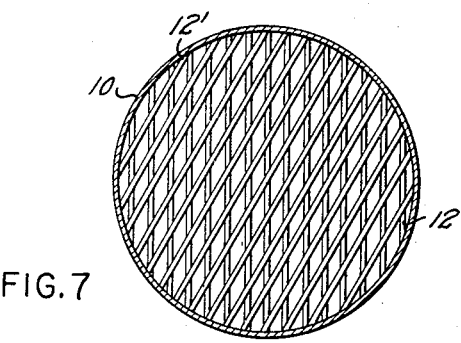
Figure 8:
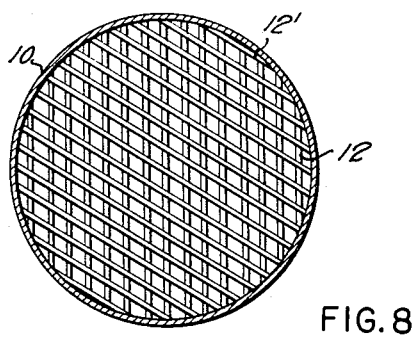
Figure 22:
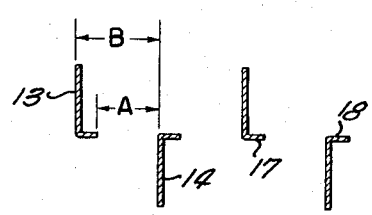
Figure 19:
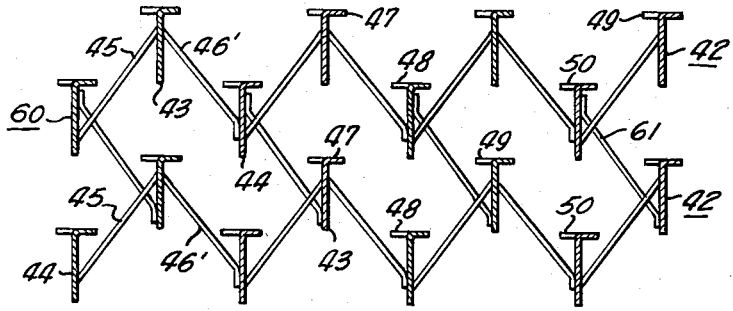
Figure 20:
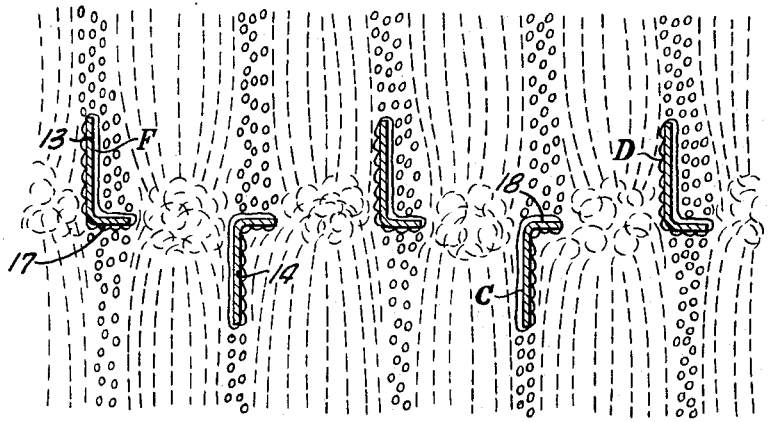
Figure 21:
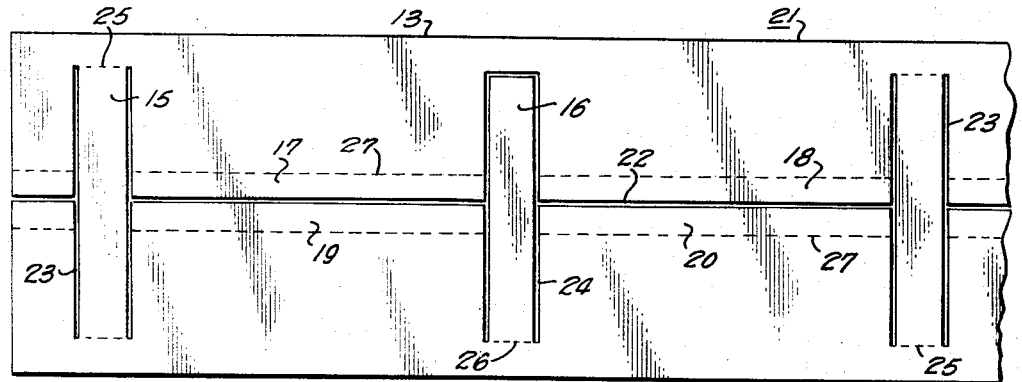

The invention will be more readily understood from a reading of the following specification and by reference to the accompanying drawings wherein examples of the invention are shown, and wherein:

FIG. 1 is a transverse, vertical, sectional view of a portion of a grid constructed in accordance with the invention and mounted in a vapor-liquid contact vessel with adjacent layers thereof in angular relation to one another, FIG. 2 is a view, similar to FIG. 1, of a slightly modified grid having its layers arranged in banks of parallel pairs and in angular relation to adjacent banks, FIG. 3 is a perspective view of a portion of the grid of FIG. 1, FIG. 4 is a perspective view of a portion of one layer of another modified grid, FIG. 5 is a view, similar to FIG. 4, of a further modification, FIGS. 6, 7 and 8 are schematic views illustrating adjacent layers of a grid in various angular relationships, FIGS. 9, 10, 11, 12 and 13 are transverse, vertical sectional views of portions of single layers of further modified grids, FIG. 13A is a top plan view of a portion of the grid layer shown in FIG. 13, FIGS. 14, 15, 16 and 17 are transverse, vertical, sectional views of portions of single layers of other forms of grids, FIG. 18 is a transverse, vertical, sectional view of a portion of a grid bank having the layers of FIG. 1 arranged in parallel pairs, FIG. 19 is a view, similar to FIG. 18, showing a grid bank having the layer of FIG. 16 arranged in parallel pairs, FIG. 20 is a diagrammatic view showing the countercurrent flow of the liquid and vapor, FIG. 21 is a plan view of a portion of an elongate strip of material cut to form a pair of the coacting grid members and connecting bars of the grid layer of FIG. 1 prior to bending of the strip, FIG. 22 is a diagrammatic view showing a portion of the upright vapor passage area of a typical grid layer, and FIG. 23 is a diagrammatic view showing the vapor-liquid contact and vapor disengagement surfaces of the grid members of a typical grid layer.

In the drawings the numeral 10 designates a portion of the upright cylindrical shell or wall of a vapor-liquid contact vessel having a grid 11 suitably supported in and extending transversely of the interior thereof. The grid 11 includes a plurality of superimposed layers or tiers 12 which, preferably but not necessarily, are arranged in horizontal parallel relationship. Any suitable quantity of the layers 12 may be employed, although only portions of four layers are shown in FIG. 1, and each layer may be disposed in angular relation to adjacent layers as indicated by the numeral 12'. An angular relationship of 90° is illustrated in FIGS. 1 and 3 for simplicity of illustration, but the angularity may be 30°, 45° or 60° as shown in FIGS. 6, 7 and 8 and many continue at the same or different angles in a helix throughout the grid 11 or be reversed from layer to layer or from group to group of layers. As will be explained, two or more adjacent grid layers may be arranged in substantial alinement or parallel, nonangular relationship to one another in a bank or group with its layers in angular relation to the layers of adjacent banks or groups.

Each of the transverse layers 12 may include a plurality of elongate, upright, reinforcing portions, legs or ribs 13 and 14 of relatively narrow height or upright width and extending transversely of the vapor-liquid contact vessel (FIG. 1). The ribs are substantially parallel and may be disposed in spaced, alternate offset or staggered relationship whereby the ribs 13 upstand and the ribs 14 depend with respect to the medial plane of each layer with the lower margins of the former, preferably, in substantially horizontal alinement with the upper margins of the latter. A plurality of inclined elements, straps or flat, narrow bars 15 and 16 extends diagonally between and spatially connect the upper portions of the upstanding ribs 13 to the lower portions of the depending ribs 14 and may be formed by cutting and bending the material of said ribs so as to be integral therewith as shown in FIG. 3. In fact, the bars 15 may be integral with a pair of adjacent ribs 13 and 14, while each bar 16 may be integral with one of the ribs 14 and welded or otherwise secured to an adjacent rib 13.

Angularly disposed or transverse portions, elements, feet or flanges 17 and 19 are provided on the lower margins of the ribs 13, and the upper margins of the ribs 14 have similar angularly disposed or transverse flanges 18 and 20 so as to extend toward adjacent ribs. If desired, the flanges 17 and 18 or the flanges 19 and 20 may be coextensive with the ribs except for the cutouts for the bars 15 and 16. Preferably, the flanges 17 and 18 extend in one direction, while the flanges 19 and 20 extend in the opposite direction. As shown most clearly in FIG. 3, the flanges 17 and 18 may alternate with the flanges 19 and 20, respectively, and are of short length in comparison to the ribs. Although some of the flanges 17 and 19 and some of the flanges 18 and 20 are adjacent one another, most of said flanges are spaced from one another by the connecting bars 15 and 16 which have portions thereof cut from the material of said flanges. It is noted that the ribs and flanges coact to provide grid members and will be so referred to hereinafter.

Each layer 12 may be constructed from a plurality of elongate strips 21 of suitable material and of sufficient length to span the transverse dimension of the vapor-liquid contact vessel. A portion of the strip 21 is shown in FIG. 21 and is cut longitudinally and medially at 22 to provide the elongate ribs 13 and 14. Pairs of closely spaced, transverse cuts 23 in the ribs and across the longitudinal cut 22 provide the bars 15 for connecting said ribs. The bars 16 are cut in a similar manner from the ribs and flanges as shown at 24, each cut extending across one end of each bar as well as along both sides. Longitudinal bend lines are provided at 25 between the ribs 13 and 14 and the ends of the bars 15, at 26 between the ribs 14 and end of the bar 16, and at 27 for the flanges 17–20. Since it is usually necessary to install and remove the grid layers through manholes in the wall of the vessel, it is customary to form each layer in elongate sections of comparatively narrow width by welding or attaching a number of the strips 21 together after bending thereof to form the ribs, connecting bars and flanges. In addition to being self-supporting over relatively long spans, each grid layer has sufficient structural rigidity to support overlying grid layers and withstand upward and downward loads or forces without deformation. The grid layers may be constructed of metallic, nonmetallic or plastic material or sheet metal of any desired analysis, such as but not limited to carbon steel, stainless steel, nickel, titanium or copper base alloys.

The flanges 17–20 may extend perpendicularly to the ribs, as shown in FIGS. 1 and 3, but any suitable oblique relationship may be employed as will be apparent hereinafter. Manifestly, an acuate angular relationship of the lower flanges 17, 17', 19 and 19' to the ribs 13 and 13' is undesirable since such flanges would tend to trap liquid; however, the upper flanges 18, 18', 20 and 20' could be at acute angles to the ribs 14 and 14'. Since the layers 12' of the grid 11 may be identical to the layers 12, the same primed numerals identify coresponding parts of the former. Adjacent layers are supported by the ribs 14 or 14' of the overlying layer resting on the ribs 13' or 13 of the underlying layer. It is customary to support grids of this general type by an annular flange (not shown) secured to the internal surface of the vessel wall 10. The flanges of the ribs of each layer are disposed in substantially the same plane since said ribs have their adjacent or inner margins in substantial alinement and said flanges utilize the material required for such alinement.

Due to the spacing apart of the grid members or ribs and flanges of each layer, a large upright or substantially vertical vapor passage area is provided and this passage area is in excess of one-half of the transverse or horizontal area of the layer since the combined width of the flanges is less than the combined width of the spaces therebetween. The relative widths of corresponding portions of the upright vapor passage and the area of the grid layer are shown at A and B, respectively, in FIG. 22. Of course, the effective area of the upright vapor passage of each layer is reduced somewhat by the angular relationship of the overlying and underlying layers; however, this reduction of area is minor and is more in the nature of the baffle due to the contiguity and communication therewith of the upright vapor passages of adjacent layers. It is noted that approximately one-half of the superficial area of each grid layer functions, primarily, as vapor-contact surfaces as shown at C in FIG. 23 and that the other half D of said superficial area performs the function of disengagement of the vapor from the liquid so as to eliminate the entrainment of the descending liquid by the ascending vapor.

It is readily apparent that a predetermined horizontal area is created by the angularly disposed flanges or transverse portions of the ribs or upright portions of each grid layer, the sum of which when subtracted from the entire area of the layer defines and creates the large, upright vapor passage area of said layer and establishes that the passage area is in excess of one-half of said layer area. The horizontally projected area created by the angularly disposed flanges of the ribs should not be confused with the superficial area of said ribs and flanges since said superficial area is always greater than twice any projected area that said angularly disposed flanges can provide. One of the sides of each grid member or each rib and each of its flanges is exposed to and presents a superficial area C in the path of the descending liquid resulting in the formation of a liquid film F thereon or a portion thereof (FIG. 20) whereby the area is wetted either by the flow of the liquid film thereover or by the turbulence, velocity or kinetic energy of the ascending vapor or by a combination thereof. Conversely, the area or portion composed of the opposite sides of each grid member or each of the ribs and each of its flanges is exposed to contact with the ascending vapor and/or the entrained liquid carried by said vapor, the vapor-liquid contact being shown at F and the entrained liquid disentrainment being shown at D in FIG. 20.

The arrangement of two or more grid layers in parallel, nonangular relationship or substantial alinement to form a bank or group 30 of grid layers with its layers 31 and 32 in angular relationship to the layers 31' and 32', which are substantially alined with each other, of each adjacent bank or group 30' is shown in FIG. 2. Again, for convenience, this angular relationship has been illustrated as being 90° and is subject to variation as explained in connection with the layers 12 and 12' of FIGS. 1 and 3. The layers 31 and 32 may be identical to the layers of the first form of the invention and have identical upper and lower reinforcing portions, or ribs 33 and 34 and connecting elements or bars 35 and 36 as well as similar transverse portions or flanges 37, 38, 39 and 40 at the lower and upper margins of the ribs coacting to provide grid members. Although the flanges 37–40 may extend at right angles to the ribs 33 and 34, like the flanges 17–20 of the ribs 13 and 14, oblique angular relationships are shown since the degree of angularity is not critical and may be less or greater as pointed out in connection with the flanges 17–20. The flanges 37 and 38 or the flanges 39 and 40 may be coextensive with the ribs 33 and 34 except as interrupted by the cutouts for the bars 35 and 36. It it noted that the ribs of the overlying layer 31 may be alined with the ribs of the underlying layer 32 or, as shown, offset or staggered relative thereto whereby the upright vapor passages through the grid bank 30 is more circuitous than the upright vapor passages of the grid layer 12.

Angular elements or bars 41, to the bars 35 and 36, extend diagonally between and connect the lower ends of the lower ribs of the overlying layer 31 to the upper ends of the upper ribs of the underlying layer 32 in horizontally and vertically spaced relationship. Since the grid bank 30' may be identical to the grid bank 30, corresponding parts of the former bear the same primed numerals. As shown in FIG. 18, the layers 12 may be arranged in grid banks in the same manner and, dependent upon the size of the manholes of the vessel, any of the grid banks may have more than two layers. Also, a deeper or thicker grid bank may be assembled within the vessel. The grid layers 12 are shown arranged in a two-layer bank or group 28 with the ribs 13 and 14 of the overlying layer offset or staggered relative to the ribs of the underlying layer. Angular connecting elements or bars 29, similar to the bars 41, secure the lower ends of the lower ribs of the overlying layer to the upper ends of the upper ribs of the underlying layer.

A portion of a modified grid layer 42 is shown in FIG. 4 and includes upper and lower reinforcing portions or ribs 43 and 44, similar to the ribs 13 and 14 of the layers 12, connected by similar elements or bars 45 and 46 in the same staggered or offset relationship with the lower margins of the upper ribs substantially alined horizontally with the upper margins of the lower ribs (FIG. 16). The ribs 43 and 44 have transverse portions or flanges 47–50 which are identical to the flanges 17–20 but which have the flanges 47 and 49 at the upper margins of the upper ribs 43 rather than at the lower margins thereof like the flanges 17 and 19 of the upper ribs. If desired, the flanges 47 and 48 or the flanges 49 and 50 may be coextensive with the ribs except for the interruptions thereof by the formation of the bars 45 and 46. Of course, the flanges need not be disposed in right angular relationship to the ribs and may extend at an oblique, either acute or obtuse, angle to said ribs.

The grid layer 42 may be modified as shown in FIG. 16 wherein the connecting elements or bars 46' are made integral with the upper ribs 43 and secured to the lower ribs 44 instead of vice versa. As shown by the numerals 47'–50' in FIG. 17, the transverse portions or flanges may be provided at the lower margins rather than the upper margins of the ribs. If desired, the flanges 47'–50' may extend at obtuse angles to the ribs like the flanges 37 and 39 of the ribs 33. A bank or group 60 of a pair of the layers 42 is shown in FIG. 19, and each layer is shown so as to include the modified connecting bars 46' of FIG. 16 rather than the connecting bars 46 of FIG. 4. The ribs of the overlying layer are shown alined with the ribs of the underlying layer instead of being offset or staggered like the ribs of the layers 31 and 32 of the grid bank 30 but, if desired, may be offset or staggered. A plurality of connecting elements or bars 61, similar to the bars, 41, secures the upper portions of the lower ribs 44 of the overlying layer to the lower portions of the upper ribs 43 of the underlying layer, whereby the flanges 47 and 49 of said underlying upper ribs are substantially in the horizontal plane of the lower margins of said overlying lower ribs. Again, it is pointed out that the ribs and flanges coact to provide grid members.

Another modified grid layer 52 is shown in FIGS. 5 and 12 and includes a plurality of elongate, upright, parallel, reinforcing portions, legs or ribs 53 of relatively narrow width or height and adapted to extend transversely of the vapor-liquid contact vessel in the same transverse or substantially horizontal plane. The ribs 53 are similar to the ribs of the other grid and a plurality of angular, inclined elements, straps or flat, narrow bars 54, similar to the bars 29, 41 and 61, extend diagonally between and spatially connect the upper and lower portions of adjacent ribs. Transverse portions, elements, feet or flanges 55 and 56 project laterally from the upper and lower margins of the ribs and may be coextensive therewith. The ribs 53 are arranged in pairs so that the upper flanges 55 of each pair of ribs extend toward each other and in the direction opposite to the lower flanges 56 of said pair of ribs, said ribs and flanges coacting to form grid members. Preferably, the flanges 55 and 56 are discontinuous and are interrupted by portions 57 and 58, respectively, extending in opposite directions in the same manner as the rib flanges of the other grid layers whereby said flanges may alternate for any desired incremental lengths thereof and provide alternate angularly disposed portions throughout the lineal lengths of the ribs.

Irrespective of whether the flanges are continuous or have alternate, oppositely-directed portions, each pair of ribs have their flanges or flange portions directed toward each other so that the widths of the areas between the pairs of ribs are substantially uniform. Although the flanges 55–58 may extend at right angles to the ribs, an oblique angular relationship is shown. To prevent the trapping of liquid by the lower flanges 56 and 58, an obtuse rather than an acute angularity is preferred. Again, it is stressed that the superficial areas of the ribs and flanges for vapor-liquid contact and vapor disengagement and the large area of the upright vapor passage of the grid layer are of primary importance, the illustrations of FIGS. 20, 22 and 23 applying to all variations of the grid tray.

In the modification shown in FIG. 9, the grid layer 62 may have upright or substantially vertical, parallel, reinforcing portions or ribs 63 disposed in the same transverse or substantially horizontal plane and arranged in pairs. Each of the ribs 63 has one of its ends spatially connected to the opposite ends of adjacent ribs by angular elements or bars 64 which are similar to the bars 54 of the grid layer 52. Transverse portions or flanges 65 and 66 are provided at the upper and lower free or unconnected ends, respectively, of the ribs and may be disposed in the illustrated right angular relation thereto or other desired angular relationship. Grid members are formed by the coaction of the ribs and flanges. Like the flanges of the other grid layers, the flanges 65 and 66 may be discontinuous and interrupted by portions 67 and 68, respectively, which extend in the opposite direction. The flanges 65–68 may extend in the same direction (FIG. 9) or in opposite directions or opposed relationship as shown by the numerals 65′–68′ in FIG. 10.

The modified grid layer 72 shown in FIG. 11 has flat, upright, inclined, reinforcing portions, ribs or members 73 disposed in a common transverse or substantially horizontal plane with the opposite ends of adjacent ribs or members connected by inclined, angular elements or bars 74, similar to the bars 64 of the grid layer 62, in spaced relationship. Alternate grid members are substantially parallel so that each of the members converges upwardly with one of its adjacent members and converges downwardly with its other adjacent members at acute angles. Preferably, the spacing between the converging margins of the grid members 73 is substantially equal as is the spacing between the diverging margins of the grid members. If desired, the flat ribs or grid members may be provided with transverse portions or flanges similar to the angular grid members of the other grid layers; however, this is not necessary since the areas of the upright vapor passages of the layer 72 are controlled by the angular relationship of said flat ribs or grid members. It is noted that the vapor-liquid contact and vapor disengagement functions of the superficial areas C and D of the angular grid members (FIG. 22) are performed by the lower and upper sides 75 and 76, respectively of the flat ribs or grid members 73 to prevent the ascending vapor from entraining the descending liquid.

As shown in FIGS. 13 and 13A, a grid player 77 may include grid members 78 and connecting bars 79 similar to the inclined grid members 73 and angular connecting bars 74 of the grid layer 72, and have alternate portions 80 and 81 thereof inclined in opposite directions to provide the desirable characteristics of the transverse portions of the angular grid members. The inclined portions 80 and 81 of each of the grid members 78 are lineally offset or staggered relative to the inclined portions of adjacent grid members and may be formed by twisting by partial notching and twisting or by partial shearing and twisting each of the grid members 78 at predetermined intervals. Thus, the portions 80 of each of the grid members converge upwardly with the portions 81 of one of its adjacent grid members and converge downwardly with the portions 81 of the other of its adjacent grid members and the alternate portions 81 of each grid member converge downwardly and upwardly with the portions 80 of its adjacent grid members.

A grid layer 82, having aligned, angular, reinforcing portions or ribs 83 with the opposite end portions of adjacent ribs spatially connected by inclined, angular elements or bars 84, may be employed (FIG. 14). The ribs 83 are identical to the ribs 63 of the grid layer 62 except that the transverse portions or flanges 85 of all said ribs 83 are at the upper margins thereof so as to be in transverse or substantially horizontal alinement, said ribs and flanges coacting to provide grid members. Preferably, the flanges 85, which extend in the same direction, are discontinuous and interrupted by portions 86 extending in opposite directions and may have the illustrated right angular relationship or other desirable oblique, acute or obtuse, angularity. As shown by the numerals 85′ and 86′ in FIG. 15, the grid layer 82 may be inverted so that the flanges are disposed at the lower margins of the ribs.

As has been pointed out hereinbefore, any of the grid layers may be utilized to provide a grid having a plurality of superimposed layers or banks or groups of layers. Liquid is adapted to be distributed over the entire area of the grid by any suitable means, such as spray nozzles, a perforated distributor, a liquid distributor pan or a plurality of pans, that essentially ensures complete distribution of the liquid over the entire upper surface of said grid. The liquid distribution may be in the form of droplets, spray, mist, sheets or a plurality of liquid streams. Because of the configuration of the individual grid layers and/or the assembly of said layers which are offset horizontally to form grid banks and/or grid layers or grid banks assembled and disposed in oriented positions relative to each other, it should be readily apparent that a large percentage of the descending liquid contacts by gravity superficial areas of said layers that are in the vertical path of the descending liquid. That portion of the liquid, which may have a free fall through the grid, is diverted by the turbulence, velocity or kinetic energy of the ascending vapor to ensure that such portion contacts superficial areas of said grid which are in close proximity to the vertical line of free fall of said descending liquid.

A grid of a depth normally required for the desired superficial area presents a small free fall area through the entire depth of the grid because of the angular orientation of the superimposed layers or layer banks comprising said grid. The ascending vapor passes through the grid in a counter-current direction to the descending liquid and, in so doing, contacts said liquid irrespective of whether the latter is in the form of a mist, spray, droplets or liquid film on the superficial areas of said grid. Because of its velocity and affinity to the liquid, the ascending vapor normally has a tendency to entrain or carry with it a portion of the decending liquid. In order for the vapor-liquid contact apparatus or grid to efficiently and properly perform its function of fractionation and/or heat transfer, it not only must cause an intimate coaction or contact of the vapor with the liquid but must also perform the function of disengaging said vapor from said liquid and prevent liquid entrainment being carried vertically through said grid by the velocity of the vapor or the affinity of the two coacting fluids.

As discussed in connection with FIGS. 20 and 23, the superficial area C of one side of each of the grid members of each grid layer, including the upright reinforcing and transverse portions of the member, is wetted by descending liquid with the result that this area primarily performs the function of presenting a liquid film F for contact by the ascending vapor. The superficial area D of the other side of the member, including its upright reinforcing and transverse portions, primarily performs the function of disengaging the ascending vapor from its entrained liquid by collecting the entrained liquid on said area which condenses and runs back or drips down through the layers of the grid. Of course, both sides of a given grid member serve as vapor-liquid contactors as well as permit liquid disentrainment from ascending vapor; however, the superficial area C of one side of the grid member performs the primary function of vapor-liquid contact, while the superficial area D of the other side of said member primarily serves as a liquid disentrainment surface. By the configuration of the grid members of each grid layer and/or by the corelationship of superimposed layers comprising a grid bank, it is obvious that a series or plurality of vapor uptake orifices is created by the relationship of adjacent grid members in a given grid layer or superimposed grid layers in a grid bank. These lineal vapor uptake orifices permit the passage of the ascending vapor with a minimum pressure drop and, at the same time, cause a lineally controlled vapor turbulence which is helpful in ensuring even distribution of the vapor flow as well as the liquid flow throughout the entire area occupied by the individual grid layers, grid-banks and the vertical depth of the entire grid. The even distribution of the vapor flow and liquid flow through the grid is further enhanced when the grid member configuration has angularly or laterally or transversely disposed portions alternating in opposed or opposite directions throughout the length of each grid member.

The more important advantages of the invention may be summarized as follows:

(A) Utilization of the superficial area of each side of each grid member, including its upright reinforcing portions and transverse portions, to primarily perform different functions.

(B) Adjacent grid members of such configuration and disposition to create a desired plurality of lineal vapor uptake orifices having a combined area in excess of one-half of the area of the grid.

(C) Utilization of the velocity and kinetic energy of the vapor to create a controlled turbulence without introducing extraneous or parasitic pressure drop, the controlled turbulence being desirably necessary to ensure thorough vapor-liquid contact in a grid of minimum vertical depth.

(D) Controlling the turbulence of the vapor to ensure equal distribution of ascending vapor and descending liquid throughout the entire grid.

(E) Maintenance of a very low pressure drop throughout the grid to permit a wide range of vapor-liquid contacting applications ranging from heat transfer or quick temperature quenching with a minimum depth of grid to an efficient vapor-liquid contact media so necessary in low density or vacuum systems.

(F) Combining the grid layers in superimposed and/or offset relationship to form layer banks with the projected horizontal areas of each layer disposed relative to the projected horizontal areas of the layer thereabove or therebelow in a manner to minimize descending liquid free fall or unobstructed passage or area through the grid.

It is noted that the superimposed grid layers which are combined to make a grid bank may be vertically disposed, one layer to the other, in any desired plane, i.e., the lowermost edge portions or margins of the grid members in a given layer of a grid bank may be positioned above, even with or below the uppermost edge portions or margins of the grid members of the grid layer therebeneath. In combining grid layers to form grid banks, the superimposed position of one layer to the other may serve to form vapor uptake orifices or to form volumetric space for vapor-liquid contact or both.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A grid for vapor-liquid contact apparatus including a plurality of transverse layers positioned one above another, each of the layers having a plurality of elongate grid members of relatively narrow upright width, a plurality of elements of narrow width extending transversely between and connecting the grid members of each layer in spaced relationship, said grid members having at least longitudinal marginal portions thereof extending toward and in angular free relation to adjacent grid members of each layer so as to provide restricted upright vapor passages of relatively large areas between adjacent grid members and create vapor turbulence for causing thorough mixing of ascending vapor and descending liquid without excessive lateral displacement of the vapor and liquid and without excessive pressure drop, the longitudinal marginal portions of said grid members having overall dimensions longitudinally of said members of such greater length than the combined width of the connecting elements that said longitudinal marginal portions are substantially coextensive with said members, one side of each longitudinal marginal portion having an upwardly facing surface adapted to be exposed to the descending liquid so as to permit the forming of a liquid film thereon for contact by the ascending vapor and thereby provide a primary vapor-liquid contact area and the other side of each longitudinal marginal portion having a downwardly facing surface adapted to be exposed to the ascending vapor for disengaging the ascending vapor from its entrained liquid by collecting the entrained liquid on the latter surface and thereby provide a primary liquid disentrainment area.

2. A vapor-liquid contact grid as set forth in claim 1 wherein the longitudinal marginal portions of the grid members project transversely from said members.

3. A vapor-liquid contact grid as set forth in claim 1 wherein the grid members of at least some of the layers are inclined and converge and diverge relative to adjacent grid members of said layers.

4. A vapor-liquid contact grid as set forth in claim 1 wherein the grid members of at least some of the layers have alternate portions thereof inclined in opposite directions and lineally offset relative to the inclined portions of adjacent grid members whereby the inclined portions of each of said grid members converge upwardly with the inclined portions of one of its adjacent grid members and converge downwardly with the inclined portions of the other of its adjacent grid members and the alternate inclined portions of each grid member converge downwardly and upwardly with the alternate inclined portions of its adjacent grid members.

5. As a sub-combination in a vapor-liquid contact grid, a plurality of elongate grid members extending in the same general direction and having coextensive upright portions of relatively narrow width, a plurality of elements of narrow width extending transversely between and connecting the grid members in spaced relationship, said grid members having at least longitudinal marginal portions thereof extending toward and in angular free relation to adjacent grid members, the longitudinal marginal portions of the grid members having overall dimensions longitudinally of said members of such greater length than the combined width of the connecting elements that said longitudinal marginal portions are substantially coextensive with said members, one side of each longitudinal marginal portion having an upwardly facing surface adapted to be exposed to descending liquid so as to permit the forming of a liquid film thereon for contact by ascending vapor and thereby provide a primary vapor-liquid contact surface, the other side of each longitudinal marginal portion having a downwardly facing surface adapted to be exposed to the ascending vapor for disengaging the ascending vapor from its entrained liquid by collecting the entrained liquid on the latter surface and thereby provide a primary liquid disentrainment area.

6. The sub-combination set forth in claim 5 wherein the longitudinal marginal portions of the grid members project laterally from said members.

7. The sub-combination set forth in claim 5 wherein the longitudinal marginal portions of the grid members include alternate elements extending in opposed relationship throughout the lengths of said members.

8. The sub-combination set forth in claim 5 wherein the grid members are inclined and converge and diverge relative to adjacent grid members.

9. The sub-combination set forth in claim 5 wherein the grid members are disposed in alternate vertically offset relationship whereby alternate grid members upstand with respect to the depending grid members therebetween.

10. The sub-combination as set forth in claim 5 wherein the grid members have alternate portions thereof inclined in opposite directions and lineally offset relative to the inclined portions of adjacent grid members whereby the inclined portions of each of said grid members converge upwardly with the inclined portions of one of its adjacent grid members and converge downwardly with the inclined portions of the other of its adjacent grid members and the alternate inclined portions of each grid member converge downwardly and upwardly with the alternate inclined portions of its adjacent grid members.

References Cited

UNITED STATES PATENTS

| | | | |
|---|---|---|---|
| 1,748,704 | 2/1930 | Chillas et al. | 261—114 |
| 1,929,712 | 10/1933 | Pearce. | |
| 2,583,390 | 1/1952 | Paasche | 261—112 X |
| 2,915,302 | 12/1959 | Jacir | 261—109 X |
| 2,983,495 | 5/1961 | Shuttleworth | 261—112 |
| 2,998,234 | 8/1961 | Haselden | 261—113 |
| 3,013,781 | 12/1961 | Haselden | 261—112 |
| 3,079,134 | 2/1963 | Winn | 261—113 |

FOREIGN PATENTS

| | | |
|---|---|---|
| 287,374 | 9/1915 | Germany. |
| 791,967 | 3/1958 | Great Britain. |

HARRY B. THORNTON, *Primary Examiner.*

E. H. RENNER, *Assistant Examiner.*